United States Patent
Hsu et al.

(10) Patent No.: US 7,471,599 B2
(45) Date of Patent: Dec. 30, 2008

(54) WRITE SIGNAL CONTROL CIRCUIT IN AN OPTICAL DISK DRIVE

(75) Inventors: Tse-Hsiang Hsu, Hsinchu (TW); Chih-Cheng Chen, Hsin Chu (TW); Yuan-Chin Liu, Tung Shi Town (TW)

(73) Assignee: Mediatek Inc., Hsin Chu (TW)

( * ) Notice: Subject to any disclaimer, the term of this patent is extended or adjusted under 35 U.S.C. 154(b) by 431 days.

(21) Appl. No.: 10/880,533

(22) Filed: Jul. 1, 2004

(65) Prior Publication Data
US 2005/0002293 A1 Jan. 6, 2005

(30) Foreign Application Priority Data
Jul. 4, 2003 (TW) ................ 92118331 A

(51) Int. Cl.
*G11B 7/0045* (2006.01)
(52) U.S. Cl. ............... 369/47.28; 369/53.34; 369/59.2; 369/59.11; 369/59.12
(58) Field of Classification Search ............. 369/53.34, 369/59.2, 47.28, 59.11, 59.12
See application file for complete search history.

(56) References Cited

U.S. PATENT DOCUMENTS

| 4,358,774 | A | * | 11/1982 | Wilkinson | 369/44.13 |
| 4,737,670 | A | * | 4/1988 | Chan | 327/278 |
| 5,161,145 | A | * | 11/1992 | Ogawa et al. | 369/59.12 |
| 5,526,333 | A | * | 6/1996 | Usui et al. | 369/47.51 |
| 5,583,838 | A | * | 12/1996 | Itoh | 369/47.31 |
| 5,608,712 | A | * | 3/1997 | Rilum et al. | 369/116 |
| 5,847,589 | A | * | 12/1998 | Arai et al. | 327/175 |
| 6,025,745 | A | * | 2/2000 | Lee et al. | 327/277 |
| 6,127,869 | A | * | 10/2000 | Hirasaka | 327/261 |
| 6,269,060 | B1 | * | 7/2001 | Harvey et al. | 369/47.28 |
| 6,445,661 | B1 | * | 9/2002 | Wu | 369/59.2 |
| 6,535,470 | B1 | * | 3/2003 | Wu | 369/53.3 |
| 6,697,308 | B1 | * | 2/2004 | Tran | 369/47.28 |
| 6,775,217 | B1 | * | 8/2004 | Kato et al. | 369/59.2 |
| 2002/0150018 | A1 | * | 10/2002 | Kelly et al. | 369/59.11 |
| 2003/0193865 | A1 | * | 10/2003 | Chiang et al. | 369/53.27 |

FOREIGN PATENT DOCUMENTS

JP    2002-334434    11/2002

* cited by examiner

*Primary Examiner*—Tan X Dinh
*Assistant Examiner*—Thomas D Alunkal
(74) *Attorney, Agent, or Firm*—Muncy, Geissler, Olds & Lowe, PLLC

(57) ABSTRACT

A write signal control circuit in an optical disk drive for adjusting the duty cycle of the write signals by a duty cycle adjusting unit. The write signal control circuit includes a write signal generator for converting an EFM signal into the write signals according to the write strategy waveform generating rules, a duty cycle adjusting unit for adjusting the duty cycle of each write signal according to adjusting parameters and for outputting adjusted write signals, and a duty cycle detector for detecting the duty cycle of each adjusted write signal and outputting a respective duty cycle control signal. The duty cycle adjusting unit further receives the duty cycle control signal to adapt the adjusting parameters.

16 Claims, 7 Drawing Sheets

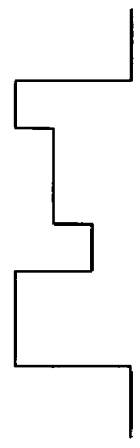
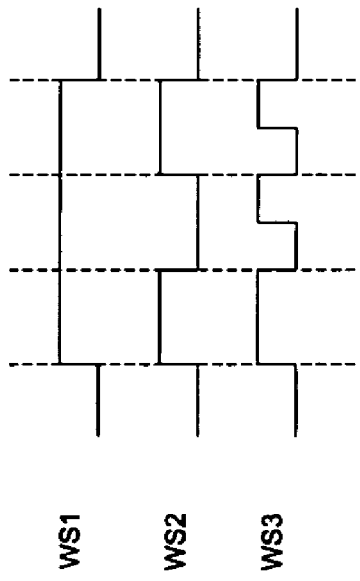
FIG. 2B (PRIOR ART)
FIG. 2A (PRIOR ART)
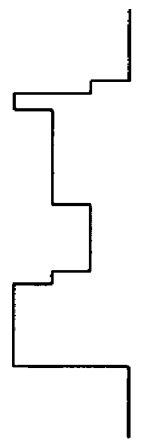
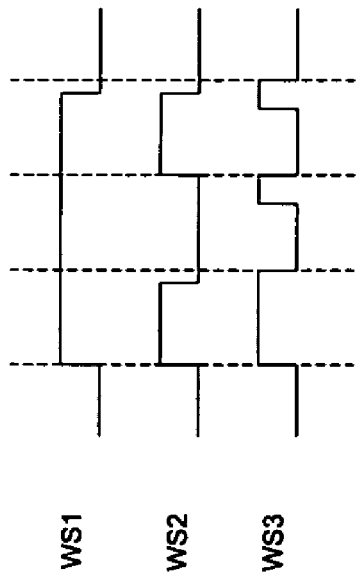
FIG. 3B (PRIOR ART)
FIG. 3A (PRIOR ART)

WRITE SIGNAL CONTROL CIRCUIT IN AN OPTICAL DISK DRIVE

This Non-provisional application claims priority under 35U.S.C. § 119(a) on Patent Application No(s). 092118331 filed in Taiwan on Jul. 4, 2003, the entire contents of which are hereby incorporated by reference.

BACKGROUND OF THE INVENTION

1. Field of the Invention

The invention relates to a write signal control circuit in an optical disk drive, and more particularly to a write signal control circuit in an optical disk drive for generating write signals having proper duty cycles.

2. Description of the Related Art

FIG. 1 illustrates a block diagram of a laser power control system in a typical optical disk writer. Referring to FIG. 1, the laser power control system 10 includes an EFM (Eight-to-Fourteen Modulation) encoder 11, a write signal generator 12, a LD (Laser diode) driver 13, and a LD 14. The EFM encoder 11 receives the input data, and generates an EFM signal according to the EFM encoding rules. The write signal generator 12 receives the EFM signal and converts the EFM signal into a plurality of write signals, e.g. three write signals WS1, WS2, WS3 as shown in FIG. 1, according to the write strategy waveform generating rules. The write signal generator 12 typically includes a write strategy pulse generator 121, a flip-flop unit 122, and a write signal calculator 123. The LD driver 13 receives the plurality of write signals and integrates them into a drive signal to drive the LD 14. How the write signal generator 12 converts the EFM signal into the write signals according to the write strategy waveform generating rules is a well-known technology in this field and can be found in U.S. Pat. No. 6,445,661, and detailed description will be omitted.

Along with the increase in write speed of the optical disk drive, the timing accuracy among the write signals becomes more critical. Correspondingly, the problems of the waveform distortion caused by the digital logic gate, the buffers, and the output drive within the write signal generator also become more serious. One of the waveform distortions is regarding to the distorted duty cycle. FIG. 2A and FIG. 2B show the waveforms of three write signals with ideal duty cycles and the corresponding drive signal, wherein FIG. 2A shows three write signals of the write signal generator 12, and FIG. 2B shows the drive signal generated by the LD driver 13. Because the duty cycles of the three write signals WS1, WS2 and WS3 inputted to the LD driver 13 are ideal, the drive signal generated by the LD driver 13 is also ideal accordingly.

FIG. 3A and FIG. 3B show the deformed write signals and the corresponding drive signal outputted by the LD driver 13, wherein FIG. 3A shows the three write signals of the write signal generator 12, and FIG. 3B shows the drive signal generated by the LD driver 13. As shown in FIG. 3A and FIG. 3B, because the duty cycles of the three write signals WS1, WS2 and WS3 are distorted, the drive signal generated by the LD driver 13 is seriously deformed, as compared that shown in FIG. 2B. If the optical disk drive outputs such a deformed drive signal to the LD 14, the data may not be recorded in the optical disk in a proper format, thereby causing data error when one tries to reproduce the data in the optical disk.

Therefore, it is an important subject to provide adjusted write signals having proper duty cycles.

SUMMARY OF THE INVENTION

In view of the above-mentioned problems, an object of the invention is to provide a write signal control circuit in an optical disk drive capable of avoiding the improper duty cycles of the write signals, wherein the write signal control circuit adjusts the duty cycles of the write signals so as to avoid the improper duty cycle of the write signals.

To achieve the above-mentioned object, the invention provides a write signal control circuit in an optical disk drive. The write signal control circuit includes a write signal generator, a duty cycle adjusting unit, and a duty cycle detector. The write signal generator receives an EFM signal and converts the EFM signal into a plurality of write signals according to the write strategy waveform generating rules. The duty cycle adjusting unit receives the write signals, adjusts the duty cycles of the write signals, and outputs a plurality of adjusted write signals with proper duty cycle.

In the calibration mode, the duty cycle detector receives the adjusted write signals outputted from the duty cycle adjusting unit, detects the duty cycle of each adjusted write signal, and outputs a respective duty cycle control signal. The duty cycle adjusting unit further receives the duty cycle control signal to adapt the adjusting parameters.

BRIEF DESCRIPTION OF THE DRAWINGS

FIG. 2A shows write signals having ideal duty cycles.
FIG. 2B shows a drive signal generated by the LD driver according to the write signals of FIG. 2A.
FIG. 3A shows deformed write signals.
FIG. 3B shows a drive signal generated by the LD driver according to the write signals of FIG. 3A.

DETAILED DESCRIPTION OF THE INVENTION

The write signal control circuit in an optical disk drive of the present invention will be described with reference to the accompanying drawings.

In the typical laser power control system, the write signals outputted from the typical write signal generator are directly outputted to the LD driver without being further detected whether the duty cycles of the write signals are proper or not. However, a practical laser power control system usually suffer from the problem of duty cycle distortion of the write signals induced by the practical implementations of the digital logic gate, the buffers, and the output drive unit. In order to solve the problems, the present invention utilizes a duty cycle detector to detect the duty cycles of the write signals, and a duty cycle adjusting unit to adjust the duty cycles of the write signals, such that the duty cycles of the write signals outputted to the LD driver are proper in the sense that the duty cycle distortion is minimized.

Figure 1:
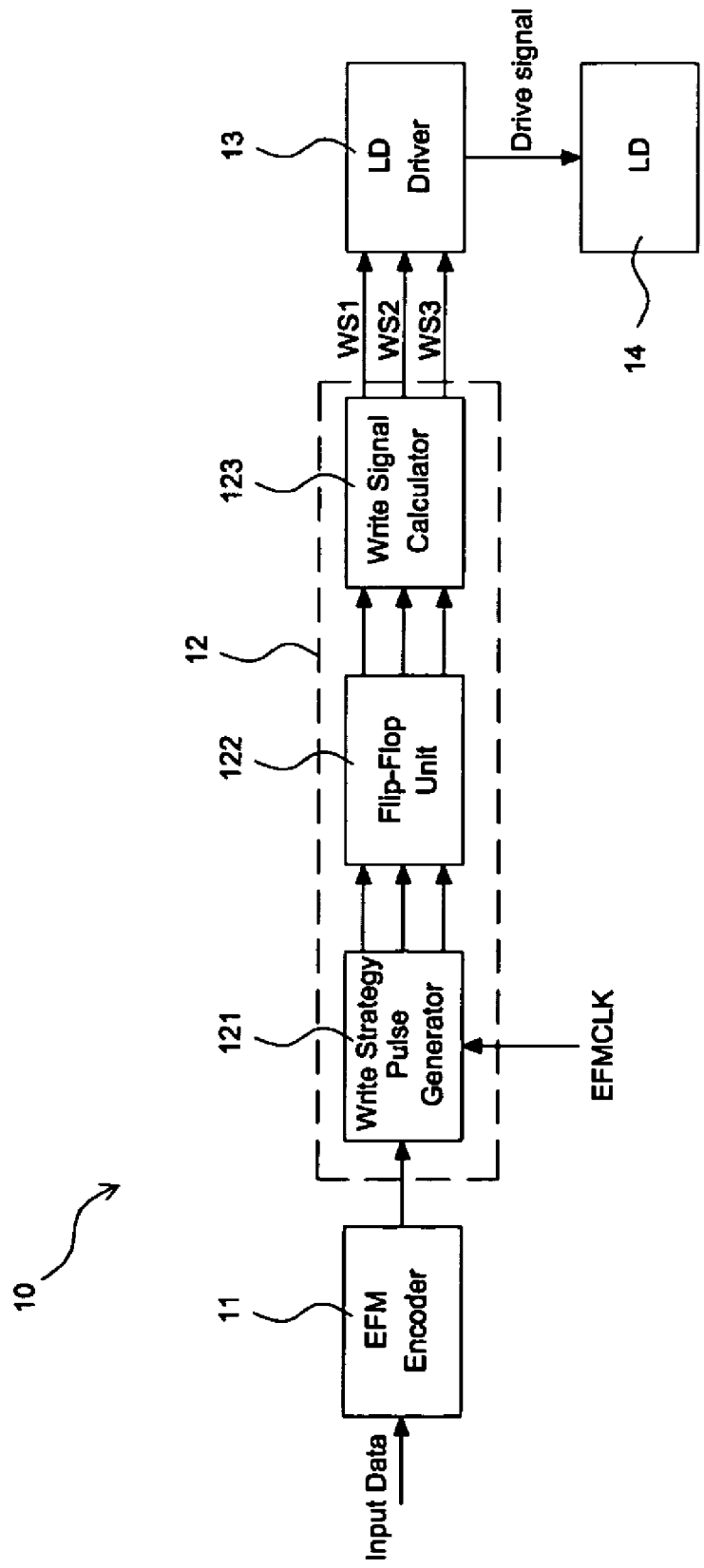
FIG. 1 illustrates a block diagram of a laser power control system in a typical optical disk writer.
Figure 4:
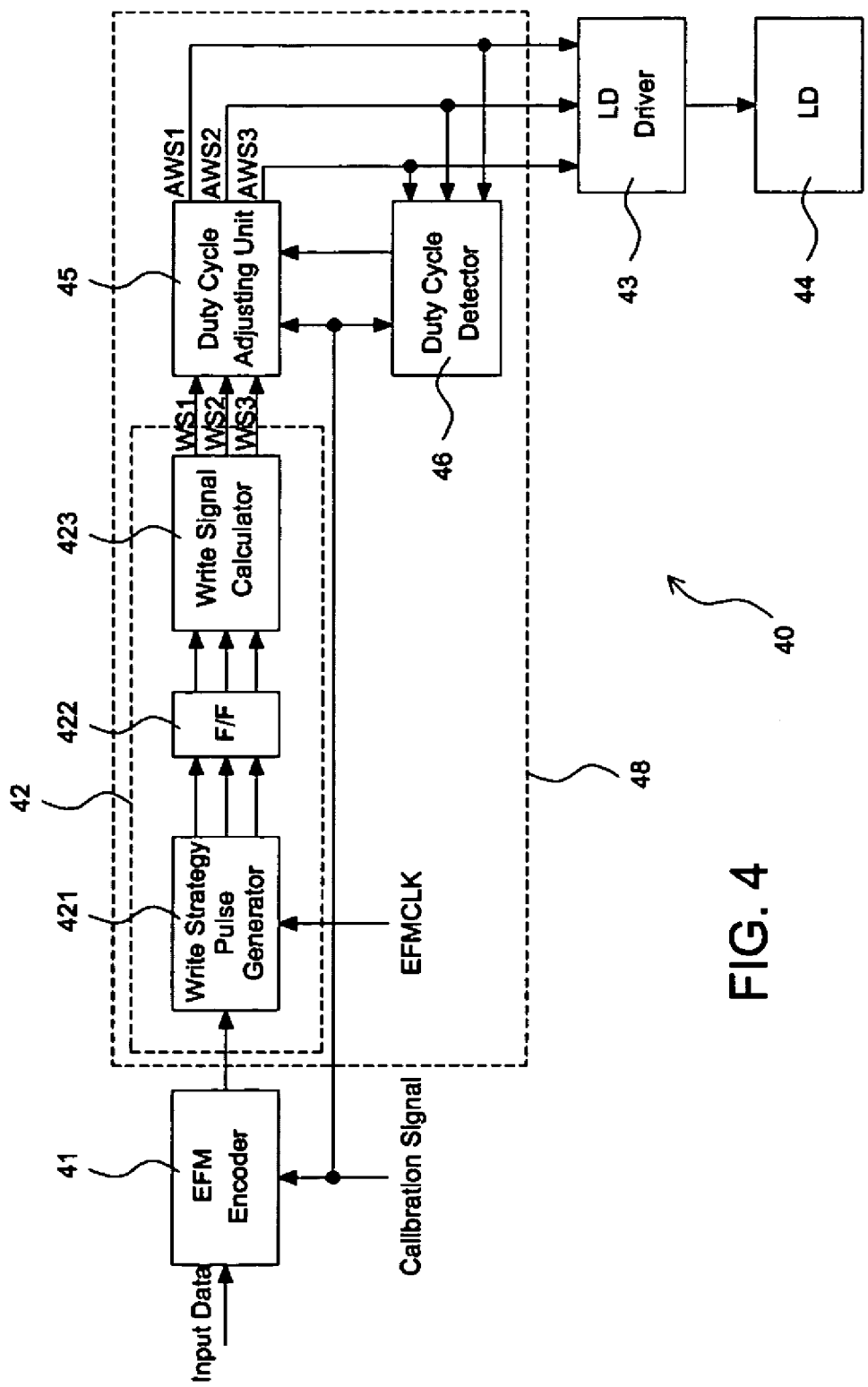
FIG. 4 illustrates a block diagram of a write signal control circuit of the invention.

FIG. 4 illustrates a block diagram of a laser power control system 40 with write signal control circuit 48 of the present invention. The laser power control system 40 includes an EFM encoder 41, a write signal control circuit 48, a LD driver 43, and a LD 44. The write signal control circuit 48 includes a typical write signal generator 42, a duty cycle adjusting unit 45, and a duty cycle detector 46. The EFM encoder 41 receives the input data and generates the EFM signal according to the EFM modulation rules. The write signal generator 42 receives the EFM signal and converts the EFM signal into a plurality of write signals, e.g. three write signals WS1, WS2 and WS3 in this embodiment, according to the write strategy waveform generating rules. The duty cycle adjusting unit 45 receives the write signals WS1, WS2 and WS3, and adjusts the duty cycle of each write signal, and outputs the adjusted write signals AWS1, AWS2 and AWS3. The LD driver 43 receives the plurality of adjusted write signals AWS1, AWS2 and AWS3, and generates a drive signal to drive the LD 44. The architectures and functions of the write signal generator 42, the LD driver 43, and the LD 44 are the same as those of the prior art, and detailed descriptions thereof will be omitted. In the calibration mode according to the present invention, the duty cycle detector 46 receives the adjusted write signals AWS1, AWS2 and AWS3 and detects the duty cycle of each of them, and outputs a respective duty cycle control signal to the duty cycle adjusting unit 45.

The write signal control circuit 48 of the invention has two operation modes, including a calibration mode and a normal mode. In the calibration mode, the duty cycle of each write signal is calibrated before the laser power control system 40 starts to write data. The normal mode is the general write mode of the write signal control circuit 48. When the write signal control circuit 48 is in the normal mode, the duty cycle detector 46 is disabled and the duty cycle adjusting unit 45 is utilized to adjust the duty cycle of each write signal according to the adjusting parameters obtained in the calibration mode so as to generate the write signals having proper duty cycles.

When the write signal control circuit 48 is in the calibration mode, the EFM signal is a preset EFM signal such that each of the write signals has a respective desired duty cycle. The duty cycle detector 46 receives the adjusted write signals AWS1, AWS2 and AWS3, detects the duty cycle of each adjusted write signal, and then generates the respective duty cycle control signal for indicating the difference between the duty cycle of adjusted write signal and the corresponding desired duty cycle. The duty cycle adjusting unit 45 adapts the adjusting parameters according to the duty cycle control signal to make the duty cycle of the write signal become more proper in the sense that the duty cycle distortion is reduced.

Figure 5:
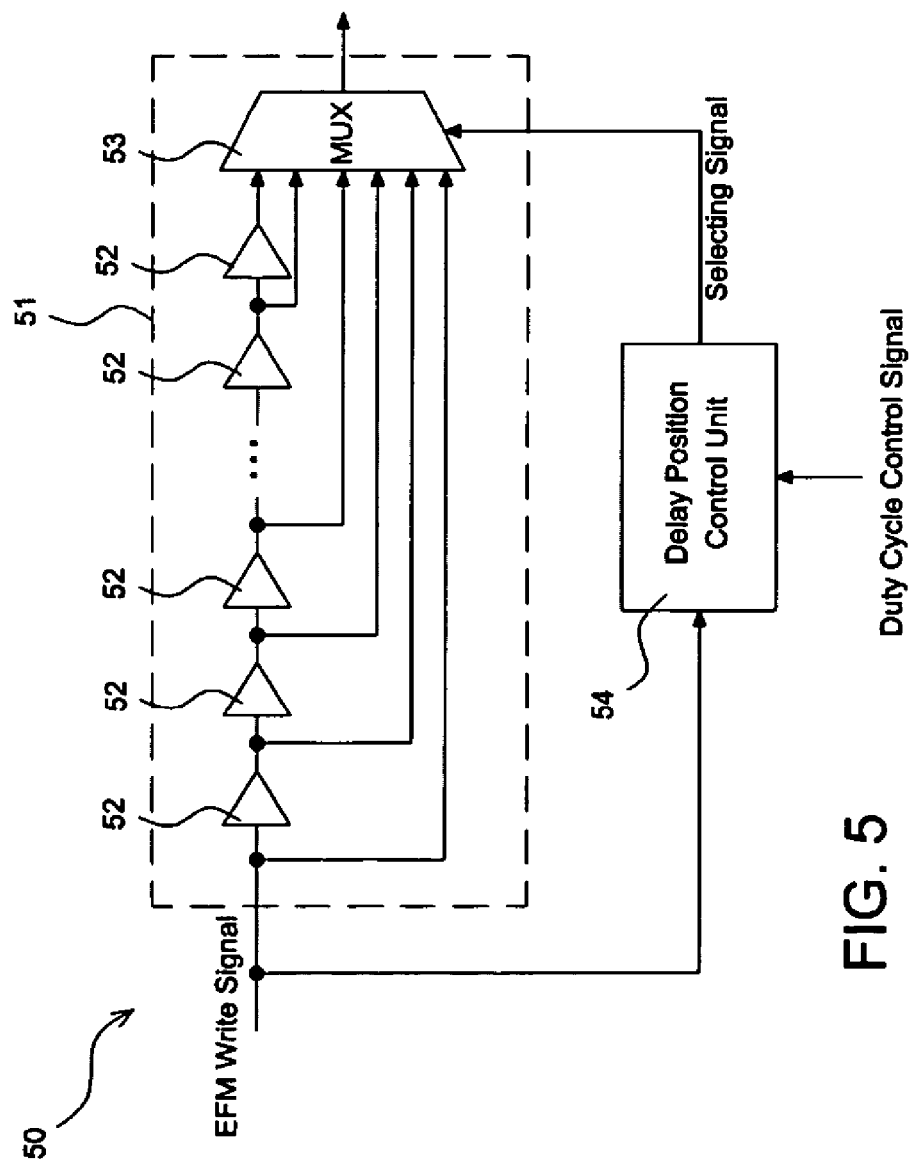
FIG. 5 shows an embodiment of each write signal adjusting module in the duty cycle adjusting unit of FIG. 4.

The duty cycle adjusting unit 45 contains three write signal adjusting modules in this embodiment. FIG. 5 shows an embodiment of each write signal adjusting module 50 in the duty cycle adjusting unit of FIG. 4. Referring to FIG. 5, each write signal adjusting module 50 of the duty cycle adjusting unit 45 includes a delay unit 51 and a delay position control unit 54. The delay unit 51 is used to generate an adjusted write signal based on the write signal and the selecting signal outputted by the delay position control unit 54. The delay unit 51 includes a plurality of delay cells 52 connected in series and a multiplexer (MUX) 53. The delay cells 52 receive the write signal and then generate a plurality of delayed versions of the write signal with different delay time, and then output the plurality of delayed versions of the write signal to the MUX 53. The MUX 53 selects one of the delayed versions of the write signal as the adjusted write signal according to the selecting signal outputted by the delay position control unit 54. Note that, the delay position control unit 54 is just an exemplary embodiment, and other embodiments are also fully supported by the present invention.

In the calibration mode, the delay position control unit 54 adapts the adjusting parameters according to the duty cycle control signal. Generally, each write signal has a leading edge and a lagging edge. The leading edge represents that the write signal is changed from a low level to a high level, while the lagging edge represents that the write signal is changed from the high level to the low level. When the duty cycle of the write signal is greater than the desired value, for example, 50%, it means that the high-level period of the write signal is longer than the low-level period. By delaying the leading edge or leading the lagging edge, the high-level period is shortened, and the duty cycle is reduced accordingly. On the contrary, when the duty cycle of the write signal is smaller than the desired value, for example, 50%, it means that the low-level period of the write signal is longer than the high-level period. By leading the leading edge or delaying the lagging edge, the low-level period is shortened, and the duty cycle is increased accordingly.

The delay position control unit 54 utilizes a first and a second counter (not shown) for respectively controlling the delay amount between the leading edges of the adjusted write signal and the write signal, and the delay amount between the lagging edges of the adjusted write signal and the write signal, in the embodiment. In the calibration mode, when the duty cycle control signal represents that the duty cycle of the adjusted write signal is greater than the desired value, e.g. 50%, either the first counter value is increased or the second counter value is decreased, so as to reduce the duty cycle of the adjusted write signal. On the contrary, when the duty cycle control signal represents that the duty cycle of the adjusted write signal is smaller than the desired value, e.g. 50%, either the first counter value is decreased or the second counter value is increased, so as to increase the duty cycle of the adjusted write signal.

In general, the delay amounts for the leading edge and the lagging edge of the write signal are different, the delay position control unit 54 has to output different selecting signal to the delay unit 51 according to different level of the write signal. When the write signal of the delay position control unit 54 is changed from a low level to a high level, the first counter value is outputted as the selecting signal, and the delay unit 51 outputs N-th delayed version of the write signal as the adjusted write signal, wherein the N represents the value of the selecting signal. On the contrary, when the write signal of the delay position control unit 54 is changed from the high level to the low level, the second counter value is outputted as the selecting signal, and the delay unit 51 outputs N-th delayed version of the write signal as the adjusted write signal, wherein the N represents the value of the selecting signal.

Figure 6:
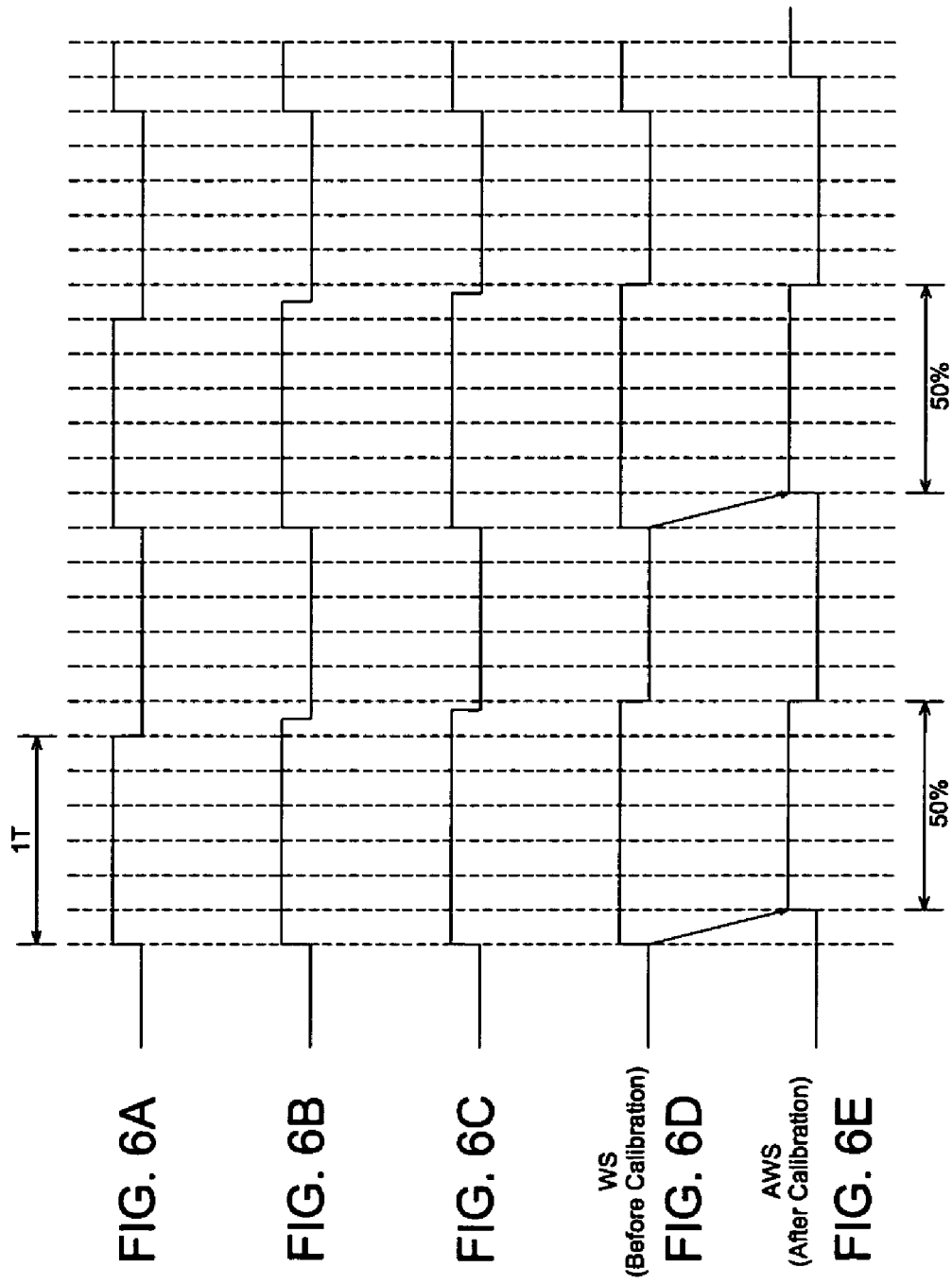
FIG. 6A shows the signal waveform outputted from the EFM encoder of the circuit of FIG. 4.
FIG. 6B shows the signal waveform outputted from the write strategy pulse generator of the circuit of FIG. 4.
FIG. 6C shows the signal waveform outputted from the flip-flop of the circuit of FIG. 4.
FIG. 6D shows the signal waveform outputted from the write signal calculating unit of the circuit of FIG. 4.
FIG. 6E shows the signal waveform outputted from the duty cycle adjusting unit of the circuit of FIG. 4.

FIGS. 6A~6E show the waveforms of some signals in the circuit of FIG. 4, wherein FIG. 6A shows the signal waveform outputted from the EFM encoder, FIG. 6B shows the signal waveform outputted from the write strategy pulse generator, FIG. 6C shows the signal waveform outputted from the flip-flop unit, FIG. 6D shows the write signal waveform outputted from the write signal calculating unit, and FIG. 6E shows the adjusted write signal waveform outputted from the duty cycle adjusting unit. As shown in FIG. 6A, in the calibration mode, the EFM encoder 41 outputs a preset EFM signal such that each of the write signals has a respective desired duty cycle. As shown in FIGS. 6B to 6D, the property of the write signal generator 42 results in the improper duty cycle of one of the output signals of the write strategy pulse generator, the flip-flop unit and the write signal calculating unit. However, after the adjustment of the duty cycle adjusting unit 45, the duty cycle of the adjusted write signal outputted to the LD driver 43 has been adjusted to a proper one, which is 50% in the example.

Figure 7:
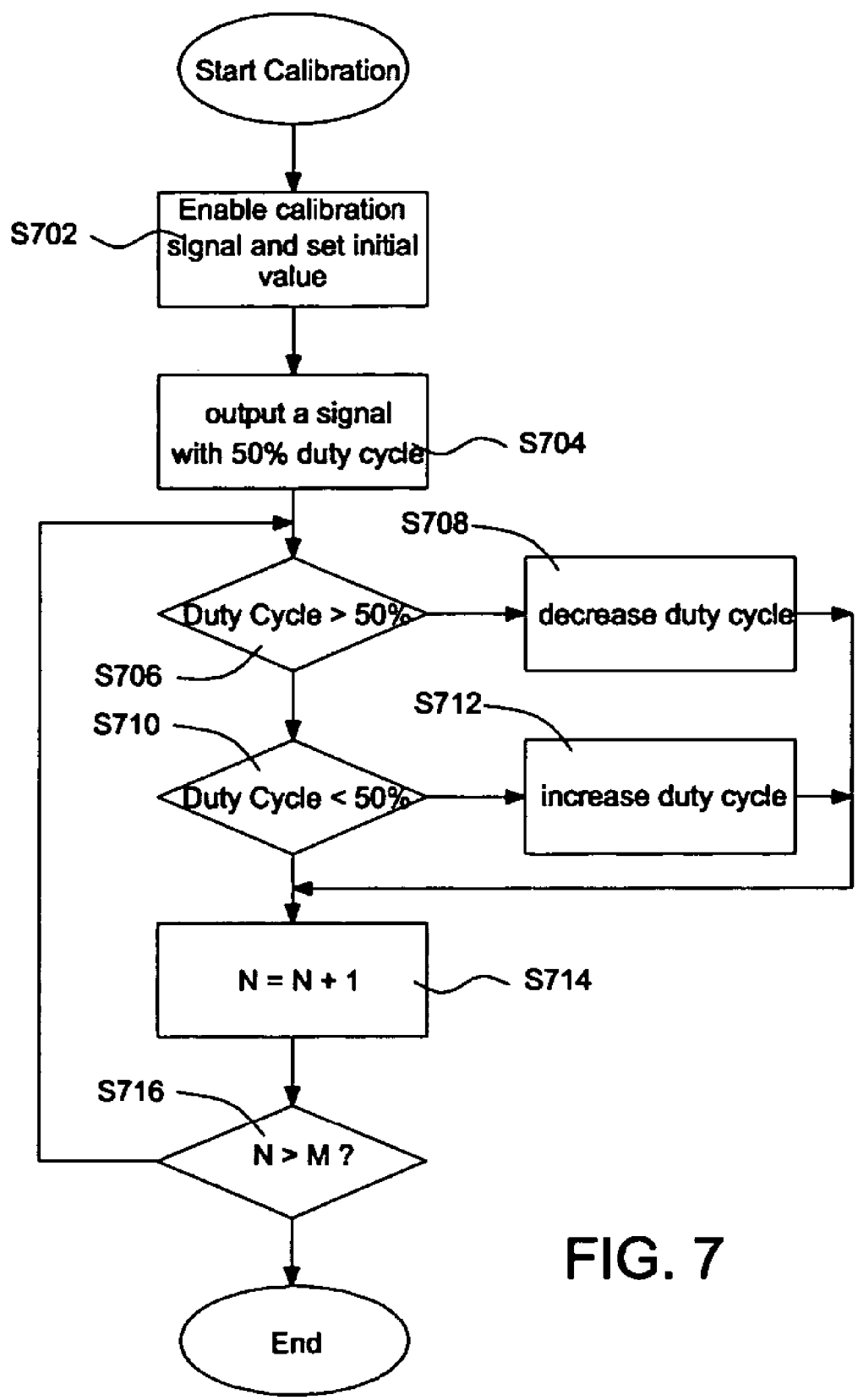
FIG. 7 is a flow chart of the method for correcting the duty cycles of the write signals of the invention.

FIG. 7 is a flow chart of the method in the calibration mode of the invention. As shown in FIG. 7, the method includes the following steps.

Step S702: enable the calibration signal which makes the write signal control circuit be in a calibration mode and reset the calibration iteration number N to zero.

Step S704: output An EFM signal whose duty cycle is, for example, 50%. To speak more specifically, after the calibration signal is enabled which means the calibration mode, the EFM encoder 41 outputs an EFM signal whose duty cycle is, for example, 50%, such that each of the write signals has a respective desired duty cycle, for example, 50%.

Step S706: detect the duty cycle of each adjusted write signal, wherein each adjusted write signal is obtained by adjusting the respective write signal according to a respective first and second counter, and the first and second counter value is respectively used to control the delay amount between the leading edges of the adjusted write signal and the write signal, and the delay amount between the lagging edges of the adjusted write signal and the write signal. If the duty cycle is greater than the desired duty cycle of, e.g., 50%, the process jumps to step S708 otherwise jumps to step S710.

Step S708: decrease the duty cycle by either increasing the first counter value, or decreasing the second counter value. Thereafter, the process jumps to step S714.

Step S710: if the duty cycle is smaller than the desired duty cycle of, e.g., 50%, the process jumps to step S712, otherwise jumps to step S714.

Step S712: increase the duty cycle by either decreasing the first counter value of the leading edge counter, or increasing the second counter value. Thereafter, the process jumps to step S714.

Step S714: increase the calibration iteration number N. That is, let N=N+1.

Step S716: compare the calibration iteration number N with a preset value M. When the calibration number N is greater than the M, the calibration is ended, otherwise jumps back to step S706.

Because the invention utilizes a duty cycle adjusting unit to adjust the duty cycle of each write signal to minimize the duty cycle distortion, the duty cycle of the write signals outputted to the LD driver 43 is ensured to be proper.

Figure 8:
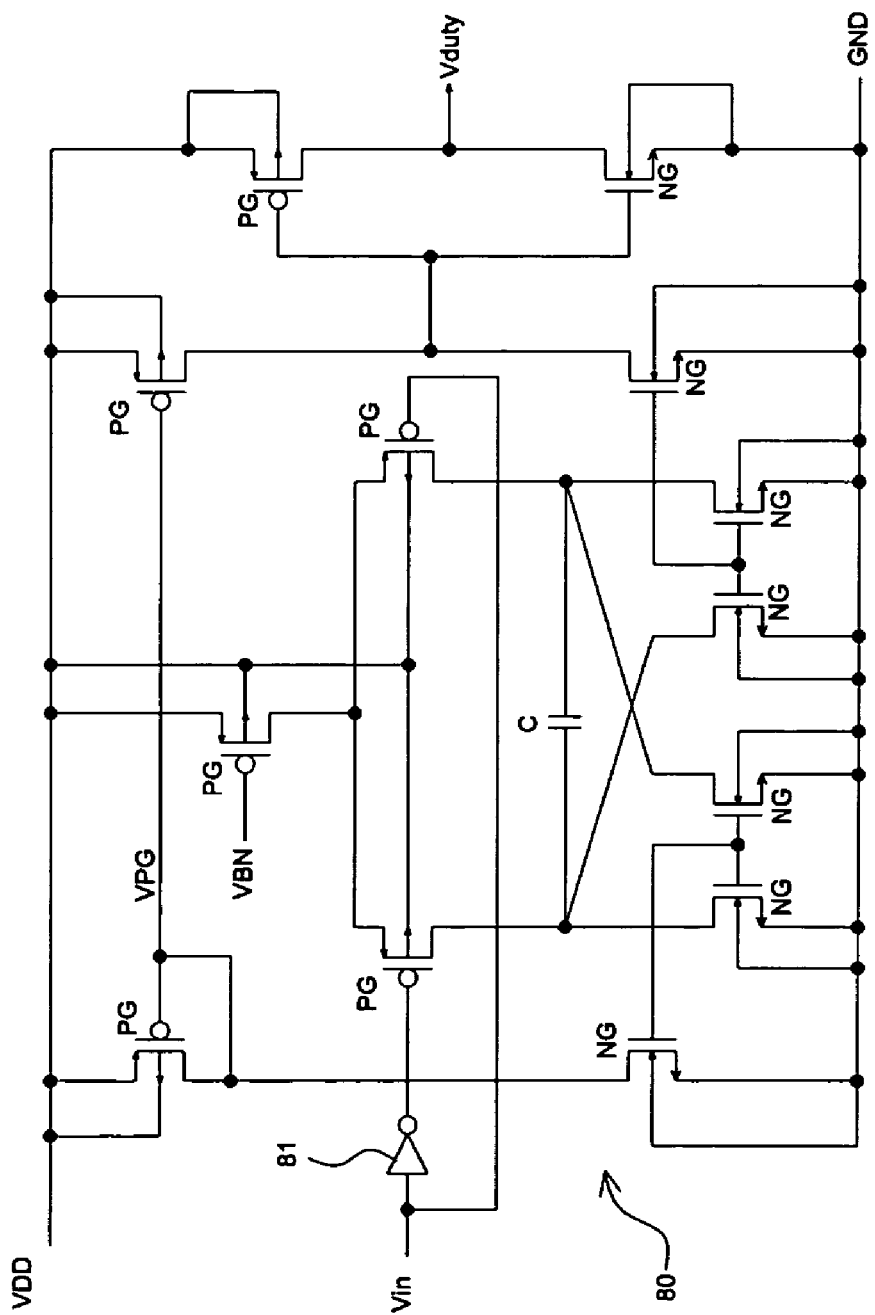
FIG. 8 illustrates an embodiment of the duty cycle detector of the write signal control circuit of the invention.

FIG. 8 shows an embodiment of the duty cycle detector of the write signal control circuit for the exemplary case that the desired duty cycle of the write signal is 50%. The input signal Vin of the duty cycle detector 80 is one of the adjusted write signals AWS1, AWS2 or AWS3. As shown in FIG. 8 a plurality of NMOS transistors NG, a plurality of PMOS transistors PG, an inverter 81, and a capacitor C are utilized to detect the duty cycle of the input signal and generate a duty cycle control signal Vduty, which has a linear relationship with the duty cycle value. When the duty cycle control signal Vduty is greater than a threshold voltage value Vth, it means that the duty cycle is greater than the desired duty cycle 50%. On the contrary, when the duty cycle control signal Vduty is smaller than the threshold voltage value Vth, it means that the duty cycle is smaller than the desired duty cycle 50%. The duty cycle control signal Vduty is thus fed back to the position delay control unit 54 in the duty cycle adjusting unit 45 for adapting the adjusting parameters. The implementation of the duty cycle detector 80 shown in FIG. 8 is just an example. Other embodiments of the duty cycle detector are also fully supported by the present invention While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A write signal control circuit in an optical disk drive, the write signal control circuit comprising:
    a write signal generator for receiving an EFM signal and converting the EFM signal into a plurality of write signals according to at least one write strategy waveform generating rule; and
    a duty cycle adjusting unit, wherein the duty cycle adjusting unit receives a plurality of preset write signals and adjusts duty cycles of the preset write signals to respective desired duty cycles to obtain a plurality of adjusting parameters at a calibration mode, and the duty cycle adjusting unit receives the write signals at a normal mode for adjusting the duty cycles of the write signals according to the plurality of adjusting parameters, and outputting adjusted write signals to compensate for duty cycle distortions.

2. The write signal control circuit according to claim 1, further comprising a duty cycle detector for receiving the adjusted write signals, detecting the duty cycle of each of the adjusted write signals, and outputting a respective duty cycle control signal.

3. The write signal control circuit according to claim 2, wherein the duty cycle adjusting unit further receives the duty cycle control signal when the write signal control circuit is in a calibration mode and adapts the adjusting parameters according to the duty cycle control signal.

4. The write signal control circuit according to claim 3, wherein the duty cycle adjusting unit is incorporated in the write signal generator.

5. The write signal control circuit according to claim 4, wherein the duty cycle detector is incorporated in the write signal generator.

6. The write signal control circuit according to claim 1, wherein the EFM signal is a preset EFM signal when the write signal control circuit is in a calibration mode, such that each of the write signals has a respective desired duty cycle value.

7. The write signal control circuit according to claim 6, wherein the duty cycle adjusting unit comprises a plurality of adjusting modules, wherein each of the adjusting modules adjusts the duty cycle of the respective write signal, and the adjusting parameters associated with each of the adjusting modules contains a first adjusting value and a second adjusting value.

8. The write signal control circuit according to claim 7, wherein each of the adjusting modules comprises:
    a delay position control unit for receiving one of the write signals and outputs the first adjusting value as a selecting signal when the write signal is changed from a low level to a high level, while outputs the second adjusting value as the selecting signal when the write signal is changed from the high level to the low level; and a delay unit for receiving the corresponding write signal and the selecting signal, and outputting the adjusted write signal according to the selecting signal, wherein the adjusted write signal is a delayed version of the write signal, and has a delay amount positively proportional to a value of the selecting signal.

9. The write signal control circuit according to claim 8, wherein the delay unit comprises:

a plurality of delay cells connected in series for receiving one of the write signals and outputting a plurality of delayed versions of the write signal; and a multiplexer for receiving the plurality of delayed versions of the write signal and the selecting signal, and outputting one of the delayed versions of the write signal as the adjusted write signal according to the selecting signal.

10. A method for generating adjusted write signals with proper duty cycle in an optical disk drive, the method comprising the steps of:

at a calibration mode:

receiving a plurality of preset write signals, each having respective desired duty cycle value; and respectively adapting the adjusting parameters according to duty cycles of the adjusted write signals to make the duty cycle of each of the adjusted write signals substantially equal to a respective desired duty cycle;

at a normal mode:

receiving an EFM signal;

converting the EFM signal into a plurality of write signals according to at least one write strategy waveform generating rule; and adjusting the write signals according to the adjusting parameters for generating the adjusted write signals with proper duty cycle.

11. The method according to claim 10, wherein the step of respectively adapting the adjusting parameters according to duty cycles of the adjusted write signals to make the duty cycle of each of the adjusted write signals substantially equal to the respective desired duty cycles comprises the steps of:

generating a plurality of delayed versions of a specific write signal of the preset write signals;

using a specific adjusting parameter corresponding to the specific write signal to select a specific delayed version of a specific write signal;

determining a difference between the duty cycle of the specific write signal and the respective desired duty cycle thereof;

selecting a specific adjusting parameter according to the difference; and selecting a specific delayed version of a specific write signal to serve as the adjusted write signal corresponding to the specific write signal.

12. The write signal control circuit according to claim 3, wherein when the write signal control circuit is in the calibration mode, the duty cycle detector repeats receiving the adjusted write signals, detecting the duty cycle of each of the adjusted write signals for a predetermined amount of times, and outputting the respective duty cycle control signal, and the duty cycle adjusting unit repeats receiving the duty cycle control signal to adapt the adjusting parameters.

13. The write signal control circuit according to claim 12, wherein after the duty cycle detector repeats receiving the adjusted write signals, detecting the duty cycle of each of the adjusted write signals for a predetermined of times, and outputting the respective duty cycle control signal for a predetermined amount of times, and the duty cycle adjusting unit repeats receiving the duty cycle control signal to adapt the adjusting parameters for the predetermined amount of times, the write signal control circuit leaves the calibration mode.

14. The write signal control circuit according to claim 3, wherein the duty cycle detector and the duty cycle control signal forms a feedback loop.

15. The method of claim 10, wherein the step of adapting adjusting parameters in the calibration mode and the step of adjusting the write signals according to the adjusting parameters further comprises:

repeatedly adapting the adjusting parameters for a predetermined amount of times; and repeatedly adjusting the write signals according to the adjusting parameters for the predetermined amount of times.

16. The method of claim 15, further comprising:

leaving the calibration mode after adjusting the write signals according to the adjusting parameters for the predetermined amount of times.

* * * * *